(12) United States Patent
Smith

(10) Patent No.: US 11,249,912 B2
(45) Date of Patent: Feb. 15, 2022

(54) APPARATUS AND METHOD FOR STORING BOUNDED POINTERS

(71) Applicant: Arm Limited, Cambridge (GB)

(72) Inventor: Lee Douglas Smith, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/971,405

(22) PCT Filed: Feb. 11, 2019

(86) PCT No.: PCT/GB2019/050352
§ 371 (c)(1),
(2) Date: Aug. 20, 2020

(87) PCT Pub. No.: WO2019/180401
PCT Pub. Date: Sep. 26, 2019

(65) Prior Publication Data
US 2021/0026773 A1    Jan. 28, 2021

(30) Foreign Application Priority Data

Mar. 19, 2018 (GB) .................................. 1804363

(51) Int. Cl.
*G06F 12/00* (2006.01)
*G06F 12/0875* (2016.01)
(Continued)

(52) U.S. Cl.
CPC ........ *G06F 12/0875* (2013.01); *G06F 3/0619* (2013.01); *G06F 3/0655* (2013.01);
(Continued)

(58) Field of Classification Search
CPC ............................... G06F 9/35; G06F 12/1441
See application file for complete search history.

(56) References Cited

U.S. PATENT DOCUMENTS

| | | | |
|---|---|---|---|
| 2008/0052468 A1 | 2/2008 | Speirs et al. | |
| 2015/0227414 A1* | 8/2015 | Varma | G06F 11/0793 714/47.1 |
| 2016/0092702 A1* | 3/2016 | Durham | G06F 9/34 713/190 |

FOREIGN PATENT DOCUMENTS

| | | |
|---|---|---|
| GB | 2540206 | 1/2017 |
| GB | 2549511 | 10/2017 |

OTHER PUBLICATIONS

International Search Report and Written Opinion of the ISA for PCT/GB2019/050352, dated May 15, 2019, 12 pages.
(Continued)

*Primary Examiner* — John A Lane
(74) *Attorney, Agent, or Firm* — Nixon & Vanderhye P.C.

(57) ABSTRACT

An apparatus and method are provided for storing bounded pointers. One example apparatus comprises a storage comprising storage elements to store bounded pointers, each bounded pointer comprising a pointer value and associated attributes including at least range information, and processing circuitry to store a bounded pointer in a chosen storage element. The storing process comprises storing in the chosen storage element a pointer value of the bounded pointer, and storing in the storage element the range information of the bounded pointer, such that the range information indicates both a read range of the bounded pointer and a write range of the bounded pointer that differs to the read range. The read range comprises at least one memory address for which reading is allowed when using the bounded pointer, and the write range comprises at least one memory address to which writing is allowed when using the bounded pointer.

20 Claims, 9 Drawing Sheets

(51) Int. Cl.
G06F 3/06 (2006.01)
G06F 21/64 (2013.01)
G06F 12/14 (2006.01)
G06F 9/35 (2018.01)

(52) U.S. Cl.
CPC .............. *G06F 3/0673* (2013.01); *G06F 9/35* (2013.01); *G06F 12/1441* (2013.01); *G06F 21/64* (2013.01); *G06F 2212/452* (2013.01)

(56) References Cited

OTHER PUBLICATIONS

Combined Search and Examination Report for GB1804363.8, dated Sep. 19, 2018, 5 pages.
Watson et al., "Capability Hardware Enhanced RISC Instructions: CHERI Instruction-Set Architecture", University of Cambridge Computer Library, Technical Report, Apr. 2017, No. 907, 307 pages.
Arm Limited, Arm® Compiler Version 6.9, armasm User Guide, Sections 16-802-807; 16-929-933; and 16-992, Oct. 25, 2017, 15 pages.

* cited by examiner

APPARATUS AND METHOD FOR STORING BOUNDED POINTERS

The presented technique relates to the field of data processing.

Some data processing apparatuses may support bounded pointers where a pointer indicating a particular address is associated with range information indicating an allowable range of addresses in which the pointer may be dereferenced. For example, such pointers may be referred to as "fat pointers".

In addition to range information, such bounded pointers may also have other associated attributes, defining one or more restrictions/permissions on the use of the pointer. Such bounded pointers with permissions are often called "capabilities" and use of such bounded pointers can hence provide strong security, by placing constraints on how the pointer value specified by the bounder pointer is used.

It would be desirable to improve the versatility of such bounded pointers.

In one example configuration, there is provided an apparatus comprising: a storage comprising storage elements to store bounded pointers, each bounded pointer comprising a pointer value and associated attributes including at least range information; and processing circuitry to store a bounded pointer in a chosen storage element, said storing comprising: storing in the chosen storage element a pointer value of the bounded pointer; storing in the chosen storage element the range information of the bounded pointer, such that the range information indicates both a read range of the bounded pointer and a write range of the bounded pointer that differs to the read range, wherein: the read range comprises at least one memory address for which reading is allowed when using the bounded pointer; and the write range comprises at least one memory address to which writing is allowed when using the bounded pointer.

In another example configuration, there is provided a method of storing a bounded pointer in a storage element of a storage, comprising: storing a pointer value of the bounded pointer; and storing range information of the bounded pointer, such that the range information indicates both a read range of the bounded pointer and a write range of the bounded pointer that differs to the read range, wherein: the read range comprises at least one memory address for which reading is allowed when using the bounded pointer; and the write range comprises at least one memory address to which writing is allowed when using the bounded pointer.

In a yet further example configuration, there is provided an apparatus comprising: storage means comprising storage element means for storing bounded pointers, each bounded pointer comprising a pointer value and associated attributes including at least range information; and processing means for storing a bounded pointer in a chosen storage element means, said storing comprising: storing in the chosen storage element means a pointer value of the bounded pointer; storing in the chosen storage element means the range information of the bounded pointer, such that the range information indicates both a read range of the bounded pointer and a write range of the bounded pointer that differs to the read range, wherein: the read range comprises at least one memory address for which reading is allowed when using the bounded pointer; and the write range comprises at least one memory address to which writing is allowed when using the bounded pointer.

The present technique will be described further, by way of illustration only, with reference to examples thereof as illustrated in the accompanying drawings, in which.

Figure 5A:
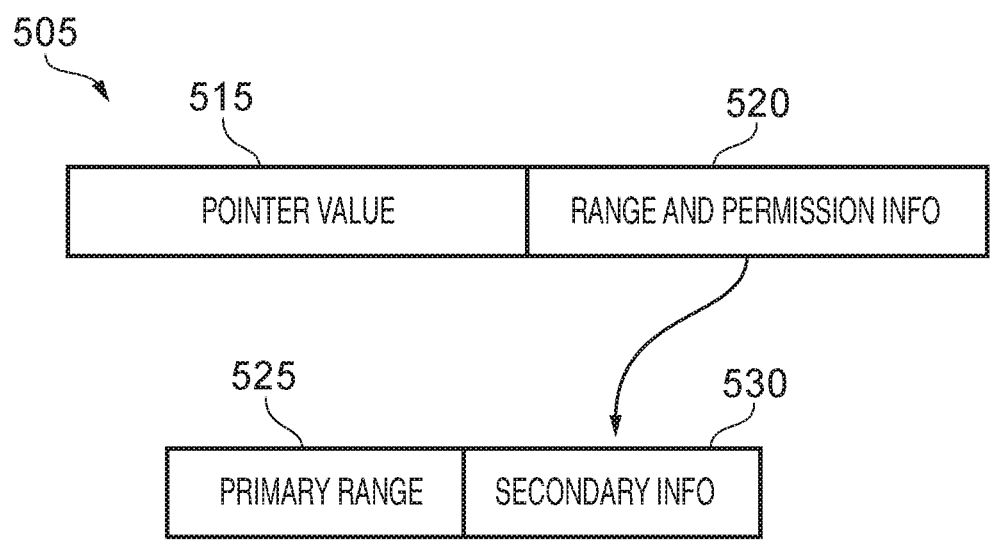
Figure 5B:
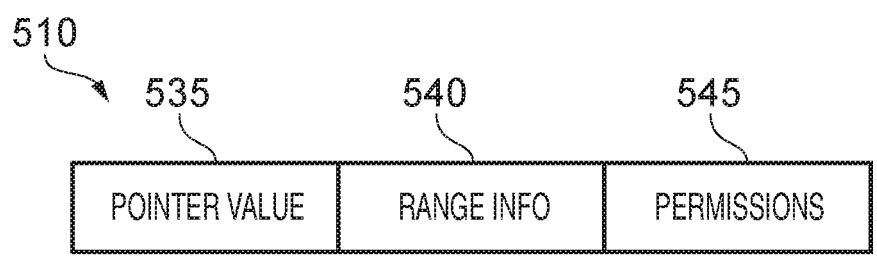
Figure 6:
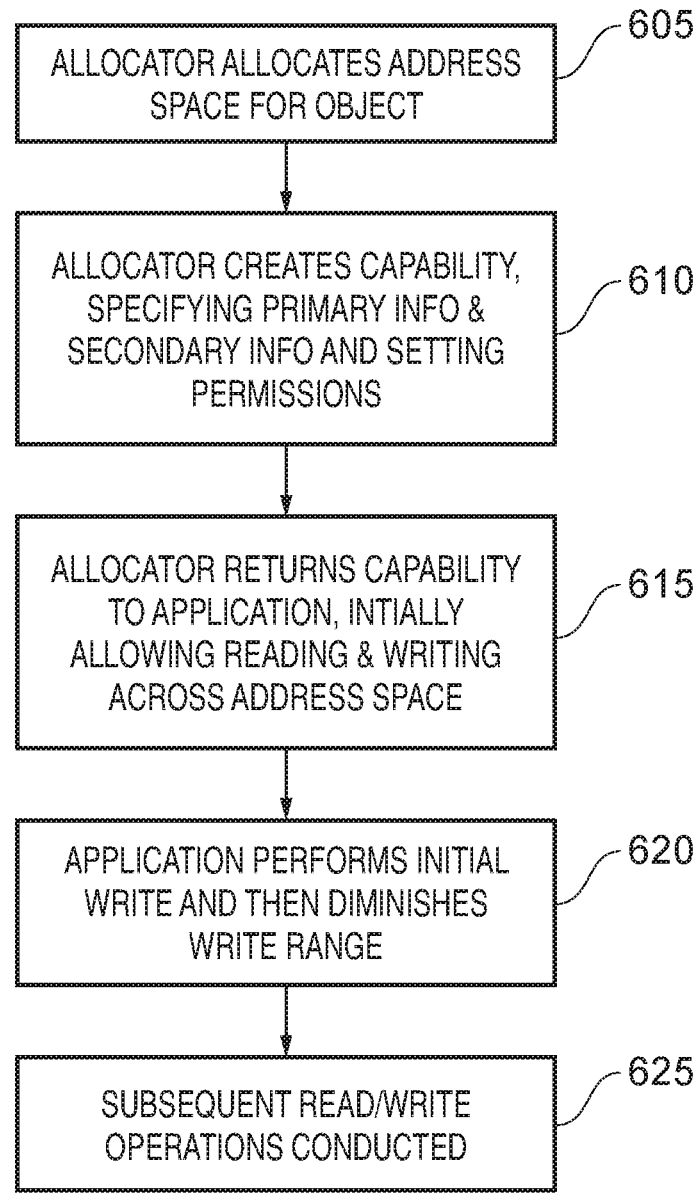
Figure 7:
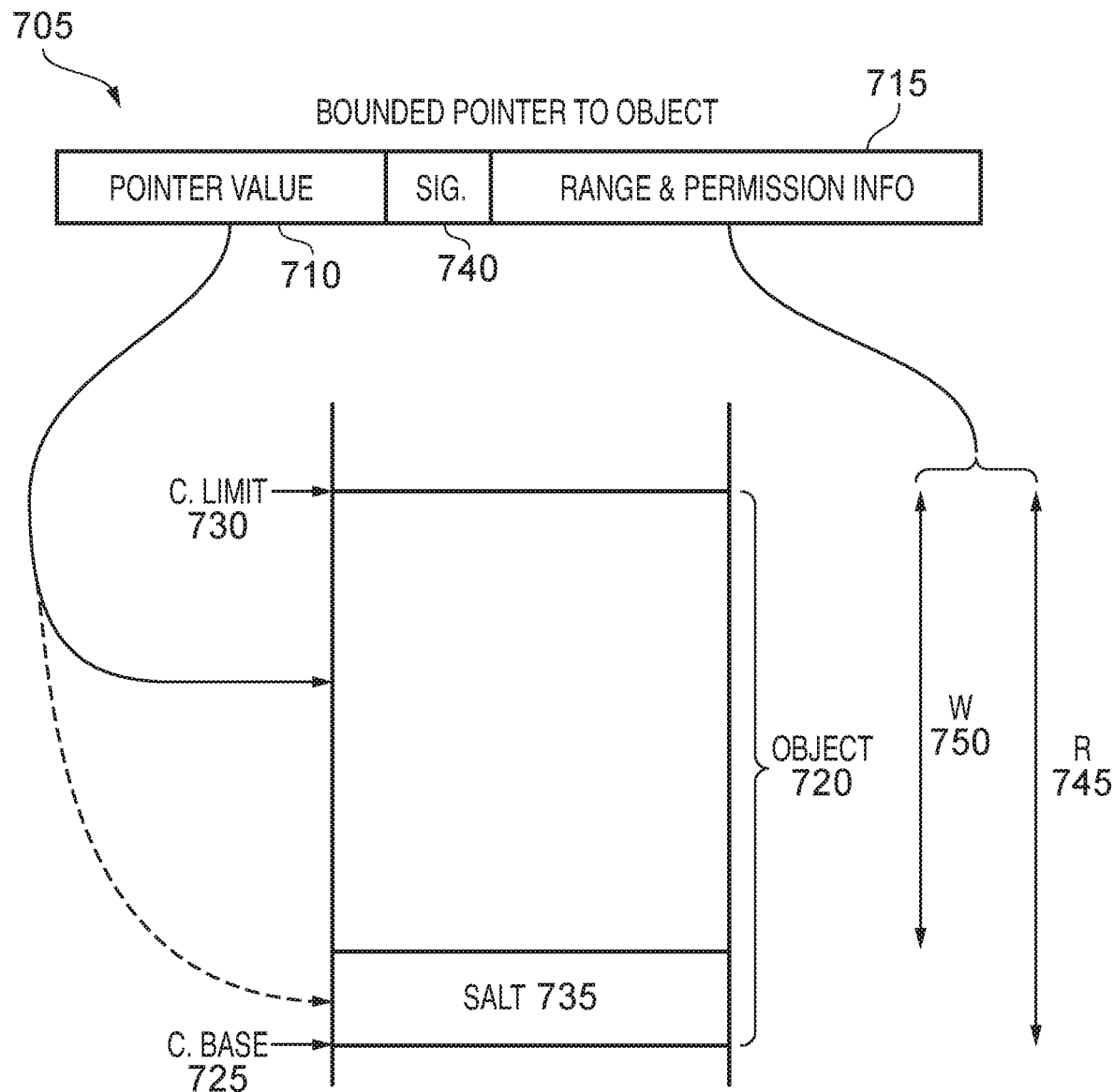
Figure 8:
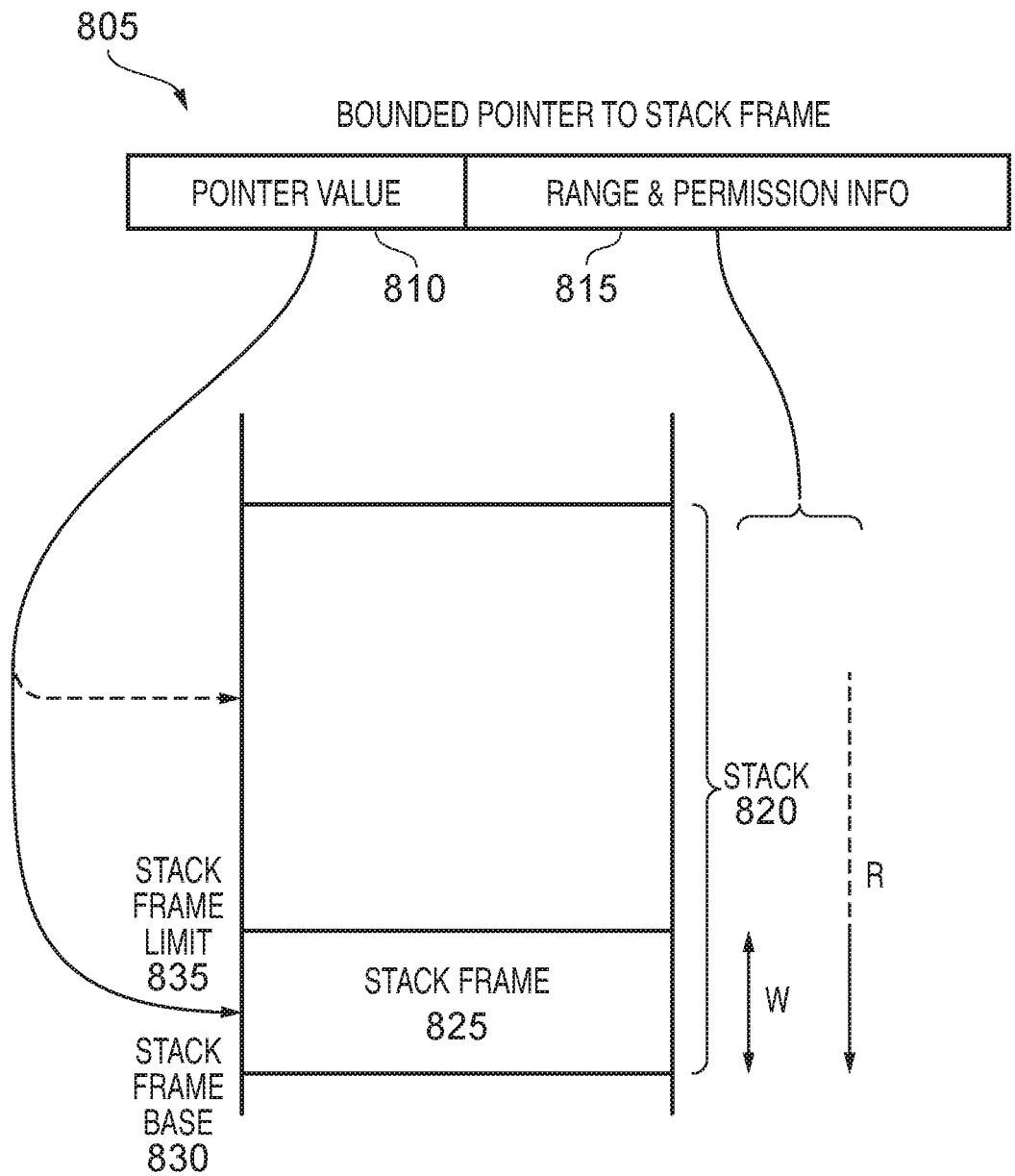
Figure 9:
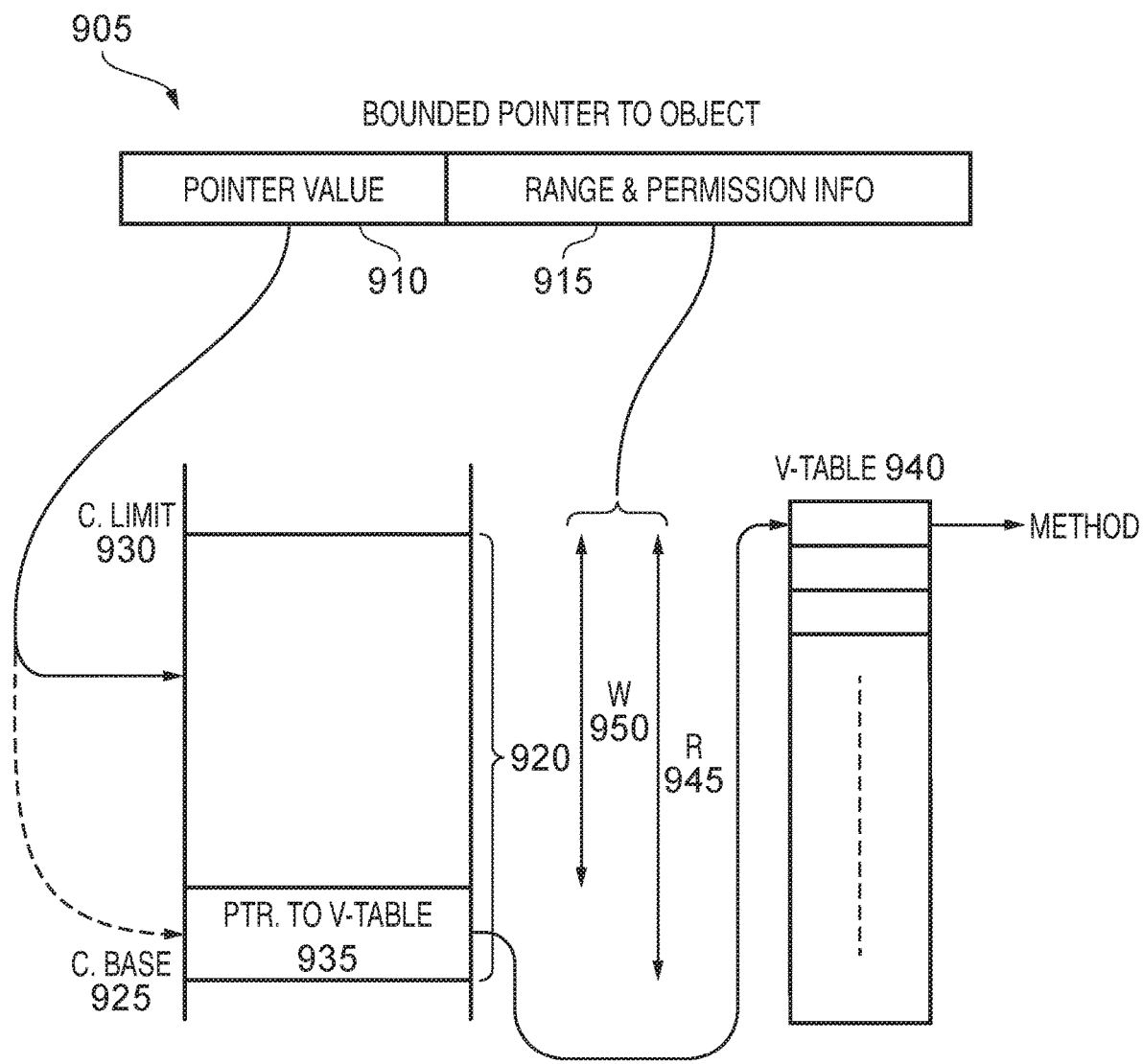

FIGS. 5A and 5B schematically show bounded pointers according to examples;

FIG. 6 is a flow diagram outlining a method according to examples of the present disclosure; and FIGS. 7 to 9 illustrate particular examples of the present disclosure.

Some processing apparatuses may support the use of bounded pointers. The pointer itself may point to, or be used to determine, the address of a data value to be accessed or an instruction to be executed, for example. However, the pointer may also have associated range information which indicates an allowable range of addresses when using the pointer. This can be useful for example for ensuring that the address determined from the pointer remains within certain bounds to maintain security or functional correctness of behaviour. For example, there is increasing interest in capability-based architectures in which certain capabilities are defined for a given process, and an error can be triggered if there is an attempt to carry out operations outside the defined capabilities. The range information for a bounded pointer may be part of the capability information defined for such an architecture, and within a capability-based architecture such a bounded pointer (including its associated capability information) may be referred to as a capability.

Hence, an apparatus may have storage elements used to store a pointer having associated range information indicative of an allowable range of addresses when using the pointer. Each bounded pointer storage element could be a register, or a memory location in general purpose memory, for example a location on a stack memory.

Certain instructions can be used to reference such a bounded pointer storage element in order to obtain a pointer which is then used to derive an address in memory required during operation of the instruction. The pointer may be used directly to identify the memory address, or may be used to derive the memory address, for example by the addition of an offset to the pointer value.

Examples of the present disclosure aim to improve the versatility of bounded pointers by applying differing range information depending on the particular usage of that pointer. In particular, a read range associated with a given pointer may be different from a write range associated with that pointer. This allows, for example, a first range of memory addresses to which the pointer may point to be a read-only range, to which data cannot be written. Reading and writing may be permitted to a second range of memory addresses to which the pointer may point. A third range of memory addresses may be a write-only range, for which reading is not permitted. In some examples discussed herein, a subset of such ranges is applied such that, for example, a read-only range is applied and a read-and-write range is applied but a write-only range is not applied. Similarly, in other examples, a read-and-write range and a write-only range are applied but a read-only range is not applied.

As noted above, some example apparatuses comprise a storage comprising storage elements to store bounded pointers, each bounded pointer comprising a pointer value and associated attributes including at least range information, and processing circuitry to store a bounded pointer in a chosen storage element. The step of storing may comprise storing in the storage element a pointer value of the bounded pointer, and storing in the storage element the range information of the bounded pointer, such that the range information indicates both a read range of the bounded pointer and a write range of the bounded pointer that differs to the read range. The read range is a range of memory addresses for which reading is allowed when using the bounded pointer, and the write range is a range of memory addresses to which writing is allowed when using the bounded pointer.

The range information is therefore capable of representing, for a given pointer, a write range that differs from a read range. This increases the versatility of the pointer relative to comparative systems in which only a single range is applied to a bounded pointer, with no further granularity being applied within that range. Examples of such versatility are provided in more detail below. For example, the present technique allows a given range of memory addresses, to which the bounded pointer can validly point, to be effectively designated as read-only by including those addresses in the read range but not the write range of a bounded pointer. The write range may therefore be a proper subset of the read range, i.e. a subset of the read range that is not equal to the read range. This is of particular utility in examples in which some data is defined once, for example during an initial setup operation, after which it is not desired to modify that data. Designating such data as read-only prevents the data from being changed, either accidentally or maliciously. The present example thus provides improved robustness and security relative to comparative systems in which it is not possible to designate data as read-only.

Alternatively or additionally, a given range of memory addresses, to which the pointer can validly point, can be designated as write-only by including those addresses in the write range but not the read range. For example, the read range may be a proper subset of the write range. This is of particular utility in examples in which it is desired to provide confidentiality. For example, where two applications communicate with each other, it may be desirable for one such application to be prevented from reading a given range of memory addresses which are nevertheless readable to another such application, whilst still being permitted to write to those addresses.

It may be desirable to reduce the size of bounded pointers in order to avoid or reduce the storage requirements associated with maintaining the bounded pointers. In such situations, it is desirable to reduce the size required to represent the range information by way of efficient encoding and/or compression. In one example way of achieving this, the range information comprises primary information and secondary information. The primary information defines a primary range, the primary range being one of the read range and write range and extending from a base address to a limit address. The secondary information is such that a secondary range can be determined based on the primary range and the secondary information, the secondary range being the other of the read range and write range. Such examples may reduce the size required to represent the range information, and thereby reduce the size of the bounded pointer, relative to an approach in which the read range and the write range were to be independently represented.

In one such example, the primary information comprises the base address of the primary range and one of the limit address of the primary range and the size of the primary range. The primary information thus explicitly defines the extent of the primary range.

In some examples, the limit address of the primary range is a limit address of the secondary range, such that the primary range and secondary range share a limit address but may have different base addresses. In examples in which this constraint is applied, the secondary information may not independently represent the limit address of the second range as such information would be redundant over the stored limit address of the primary range. Conversely, in some examples the base address of the primary range is a secondary range base address of the secondary range, such that the primary and secondary range share a base address but may have different limit addresses. In examples in which this constraint is applied, the secondary information may not independently represent the base address of the second range as such information would be redundant over the stored base address of the primary range. In these examples, the memory required to store the range information can thereby be reduced by not including such redundant information.

In some examples, the secondary information identifies how at least one of a secondary range base address and a secondary range limit address are determined from the base address and limit address of the primary range. For example, where the primary and secondary ranges share a base address, the secondary information may define the limit address of the secondary range but not its base address. Similarly, where the primary and secondary ranges share a limit address, the secondary information may define the base address of the secondary range but not its limit address.

In some systems it is desirable for the difference between the primary and secondary ranges to be predefined. For example, it may sometimes be desirable for a given number of bytes at the beginning of a bounded pointer's range to be read-only, for example because those bytes include cryptographic data that is not to be modified. In some such examples, the secondary information is a flag indicating that the secondary range excludes a predefined portion of the primary range. The flag can thus be set, to indicate that the given number of bytes at the beginning of the pointer's range is read-only, or unset, to indicate that the pointer's entire range can be written to as well as read. Usage of the flag, which may be a single bit, provides a particularly efficient mechanism for providing the information required to define the second range from the first range. In one example arrangement, prior to an initial write via the bounded pointer, the flag is not set. Then, the flag may be set following the initial write. This allows the initial write to write to the predefined portion that is to be excluded from subsequent writes, in order to initialise that portion, following which no further writing is permitted. In certain examples of capability-based systems, a capability can be diminished but not augmented. Thus, in such examples, once the flag is set it cannot be unset.

In other examples, the secondary information comprises a flag indicating that the limit address of the secondary range is unconstrained by the limit address of the primary range. For example, the primary and secondary ranges may share a base address, while the primary range has a limit address but the secondary address does not. Where the primary range is the write range and the secondary range is the read range, this allows writing to be constrained to a given range, whilst reading is permitted for any memory address above the base address, subject to any additional constraints within the system. For example, where the pointer is associated with an application, it may be desirable to be able to read any memory address within a memory stack, whilst only permitting writing to memory addresses within a stack frame. In some examples, the read range may effectively be limited by other system mechanisms, for example by forbidding any access to memory addresses outside a stack associated with a given application.

Some more specific examples will now be discussed. These examples are described in more detail below with reference to FIGS. 1 to 9.

In one example, the pointer value of the bounded pointer identifies a memory address within an address space for an object. A location within said address space stores a pointer identifying a data structure identifying methods available to said object. The pointer may for example be a bounded pointer. An example of such a data structure is a virtual method table of an object class to which said object belongs. The read range includes said pointer to the data structure, and the write range excludes said pointer to the data structure. This allows the pointer to be read-only such that it cannot be altered in order to cause a redirection to an undesired memory address, either accidentally (for example as a consequence of a software bug) or maliciously (for example in an attempt to cause execution of methods other than those belonging to said object's class definition).

In another example, the pointer value of the bounded pointer identifies a memory address within an address space for an object, and part of said address space comprises metadata for the object. For example, the attributes of the bounded pointer may comprise a signature, such as a cryptographic signature, for authenticating the bounded pointer, and the metadata may then comprise a salt value used when generating said signature. The read range includes said part comprising the metadata, and the write range excludes said part comprising the metadata. The metadata, for example the cryptographic salt, can thus be made read-only thereby reducing the likelihood of accidental or malicious corruption thereof. In some examples, said metadata comprises a pointer to further metadata, or other data allowing such metadata to be identified. For example, said metadata may be a pointer to the aforementioned cryptographic salt.

In one such example, an allocator allocates the address space to the object and retains write access to the address space. The allocator may for example be implemented by software executing on processor circuitry. When the allocator determines to free the address space allocated to the object, the allocator is arranged to overwrite the salt value. An attempt to authenticate a pointer to the object using the salt after the address space is freed would thus fail, thereby providing resistance against use-after-free attacks.

The range information of the bounded pointer may then comprise read range data defining the read range, and exclusion data indicating that the write range excludes said part of the address space containing the metadata. Similarly to other examples discussed above, this provides resistance against accidental or deliberately malicious modification of the metadata following the initial write.

Said part of the address space containing the metadata may have a predefined size. For example, the metadata may be a cryptographic salt with a size of 8 bytes. Secondary range information may thus comprise a flag, for example a single bit, indicating whether the 8 bytes corresponding to the salt is to be excluded from the write range, thereby efficiently representing that information.

In another example, the pointer value of the bounded pointer identifies a memory address within a stack frame of an application, the stack frame residing within a stack. In this example, the read range includes the stack frame and a further portion of the stack, and the write range is constrained to the stack frame of the stack, and excludes the further portion of the stack. A given application to which the bounded pointer corresponds can thus be permitted to read for example the entirety of the stack, whilst being permitted to write to the stack frame but forbidden from writing outside the stack frame.

In one such example, the range information indicates a base address of the stack frame and a limit address of the stack frame. The range information comprises a flag indicating that the limit address of the stack frame is not a limit address of the read range. The fact that the read range should not be constrained by the extent of the stack frame can thus be efficiently represented, for example by a single bit. The read range can be constrained, for example to the extent of the stack, by other system mechanisms such as a mechanism preventing a pointer associated with an application from accessing any memory addresses above the stack.

Particular examples will now be described with reference to the Figures.

Figure 1:
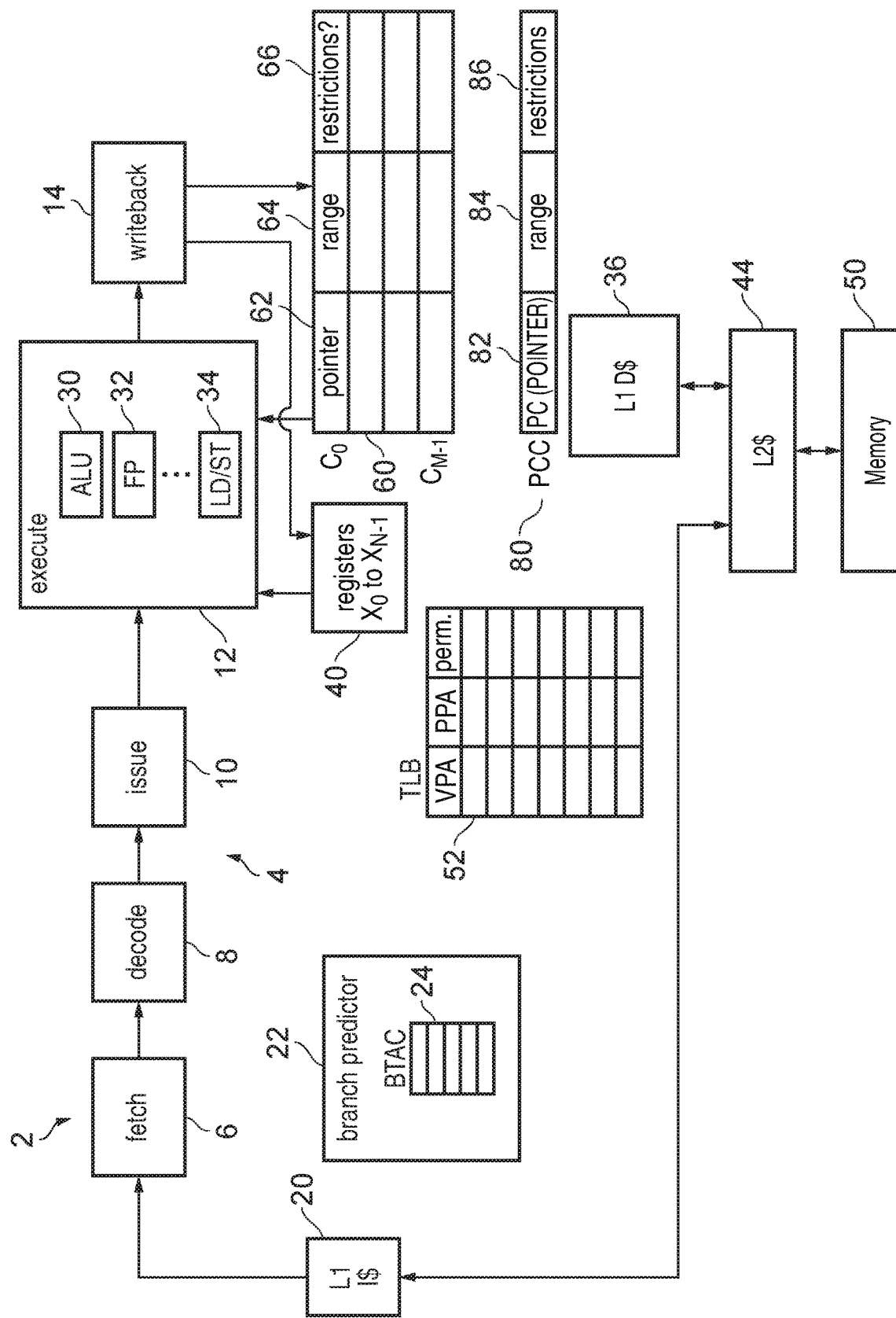
FIG. 1 is a block diagram of an apparatus in accordance with one example arrangement.

FIG. 1 schematically illustrates an example of a data processing apparatus 2 comprising a processing pipeline 4 for processing instructions. In this example the processing pipeline 4 includes a number of pipeline stages including a fetch stage 6, a decode stage 8, an issue stage 10, an execute stage 12, and a write back stage 14, but it will be appreciated that other types or combinations of stages may be provided. For example a rename stage for performing register renaming could be included in some implementations. Instructions to be processed move from stage to stage, and while an instruction is pending at one stage another instruction may be pending at a different stage of the pipeline 4.

The fetch stage 6 fetches instructions from a level 1 (L1) instruction cache 20. The fetch stage 6 may usually fetch instructions sequentially from successive instruction addresses. However, the fetch stage may also have a branch predictor 22 for predicting the outcome of branch instructions, and the fetch stage 6 can fetch instructions from a (non-sequential) branch target address if the branch is predicted taken, or from the next sequential address if the branch is predicted not taken. The branch predictor 22 may include one or more branch history tables for storing information for predicting whether certain branches are likely to be taken or not. For example, the branch history tables may include counters for tracking the actual outcomes of previously executed branches or representing confidence in predictions made for branches. The branch predictor 22 may also include a branch target address cache (BTAC) 24 for caching previous target addresses of branch instructions so that these can be predicted on subsequent encounters of the same branch instructions.

The fetched instructions are passed to the decode stage 8 which decodes the instructions to generate decoded instructions. The decoded instructions may comprise control information for controlling the execute stage 12 to execute the appropriate processing operations. For some more complex instructions fetched from the cache 20, the decode stage 8 may map those instructions to multiple decoded instructions, which may be known as micro-operations (μops or uops). Hence, there may not be a one-to-one relationship between the instructions fetched from the L1 instruction cache 20 and instructions as seen by later stages of the pipeline. In general, references to "instructions" in the present application should be interpreted as including micro-operations.

The decoded instructions are passed to the issue stage 10, which determines whether operands required for execution of the instructions are available and issues the instructions for execution when the operands are available. Some implementations may support in-order processing so that instructions are issued for execution in an order corresponding to the program order in which instructions were fetched from the L1 instruction cache 20. Other implementations may support out-of-order execution, so that instructions can be issued to the execute stage 12 in a different order from the program order. Out-of-order processing can be useful for improving performance because while an earlier instruction is stalled while awaiting operands, a later instruction in the program order whose operands are available can be executed first.

The issue stage 10 issues the instructions to the execute stage 12 where the instructions are executed to carry out various data processing operations. For example the execute stage may include a number of execute units 30, 32, 34 including an arithmetic/logic unit (ALU) 30 for carrying out arithmetic or logical operations on integer values, a floating-point (FP) unit 32 for carrying out operations on values represented in floating-point form, and a load/store unit 34 for carrying out load operations for loading a data value from a level 1 (L1) data cache 36 to a register 40 or store operations for storing a data value from a register 40 to the L1 data cache 36. It will be appreciated that these are just some examples of the types of execute units which could be provided, and many other kinds could also be provided. For carrying out the processing operations, the execute stage 12 may read data values from a set of registers 40. Results of the executed instructions may then be written back to the registers 40 by the write back stage 14.

The L1 instruction cache 20 and L1 data cache 36 may be part of a cache hierarchy including multiple levels of caches. For example a level two (L2) cache 44 may also be provided and optionally further levels of cache could be provided. In this example the L2 cache 44 is shared between the L1 instruction cache 20 and L1 data cache 36 but other examples may have separate L2 instruction and data caches. When an instruction to be fetched is not in the L1 instruction cache 20 then it can be fetched from the L2 cache 44 and similarly if the instruction is not in the L2 cache 44 then it can be fetched from main memory 50. Similarly, in response to load instructions, data can be fetched from the L2 cache 44 if it is not in the L1 data cache 36 and fetched from memory 50 if required. Any known scheme may be used for managing the cache hierarchy.

The addresses used by the pipeline 4 to refer to program instructions and data values may be virtual addresses, but at least the main memory 50, and optionally also at least some levels of the cache hierarchy, may be physically addressed. Hence, a translation lookaside buffer 52 (TLB) may be provided for translating the virtual addresses used by the pipeline 4 into physical addresses used for accessing the cache or memory. For example, the TLB 52 may include a number of entries each specifying a virtual page address of a corresponding page of the virtual address space and a corresponding physical page address to which the virtual page address should be mapped in order to translate the virtual addresses within the corresponding page to physical addresses. For example the virtual and physical page addresses may correspond to a most significant portion of the corresponding virtual and physical addresses, with the remaining least significant portion staying unchanged when mapping a virtual address to a physical address. As well as the address translation information, each TLB entry may also include some information specifying access permissions such as indicating whether certain pages of addresses are accessible in certain modes of the pipeline 4. In some implementations, the TLB entries could also define other properties of the corresponding page of addresses, such as cache policy information defining which levels of the cache hierarchy are updated in response to read or write operations (e.g. whether the cache should operate in a write back or write through mode), or information defining whether data accesses to addresses in the corresponding page can be reordered by the memory system compared to the order in which the data accesses were issued by the pipeline 4.

While FIG. 1 shows a single level TLB 52, it will be appreciated that a hierarchy of TLBs may be provided so that a level one (L1) TLB 52 may include TLB entries for translating addresses in a number of recently accessed pages and a level two (L2) TLB may be provided for storing entries for a larger number of pages. When a required entry is not present in the L1 TLB then it can be fetched from the L2 TLB, or from further TLBs in the hierarchy. If a required entry for a page to be accessed is not in any of the TLBs then a page table walk can be performed to access page tables in the memory 50. Any known TLB management scheme can be used in the present technique.

Also, it will be appreciated that some systems may support multiple levels of address translation so that, for example, a first TLB (or hierarchy of TLBs) may be used to translate virtual addresses into intermediate addresses, and a second level of address translation using one or more further TLB(s) may then translate the intermediate addresses into physical addresses used to access a cache or memory. This can be useful for supporting virtualisation where the first level of address translation may be managed by the operating system and the second level of address translation may be managed by the hypervisor, for example.

As shown in FIG. 1, the apparatus 2 may have a set of bounded pointer registers 60. Whilst the set of bounded pointer registers is shown in FIG. 1 as being physically separate to the set of general purpose data registers 40, in one implementation the same physical storage may be used to provide both the general purpose data registers and the bounded pointer registers.

Each bounded pointer register 60 includes a pointer value 62 that may be used to determine an address of a data value to be accessed, and range information 64 specifying an allowable range of addresses when using the corresponding pointer 62. The bounded pointer register 60 may also include restrictions information 66 (also referred to herein as permissions information) which may define one or more restrictions/permissions on the use of the pointer. For example the restriction 66 could be used to restrict the types of instructions which may use the pointer 62, or the modes of the pipeline 4 in which the pointer can be used. Hence, the range information 64 and restriction information 66 may be considered to define capabilities within which the pointer 62 is allowed to be used. When an attempt is made to use a pointer 62 outside the defined capabilities, an error can be triggered. The range information 64 can be useful for example for ensuring that pointers remain within certain known bounds and do not stray to other areas of the memory address space which might contain sensitive or secure information. In an example where the same physical storage is used for both general purpose data registers and bounded pointer registers, then in one implementation the pointer value 62 may for example be stored within the same storage location as used for a corresponding general purpose register.

Figure 2:
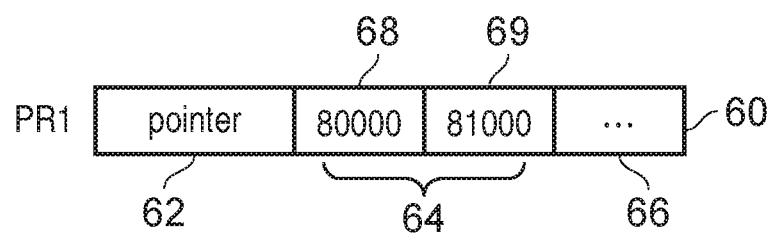
FIG. 2 shows examples of types of instruction for which an error may be triggered if there is an attempt to set or access a pointer value within the set of bounded pointer storage elements, where that pointer value is used to specify an address outside the range indicated by the associated range information.

FIG. 2 shows an example of types of instructions for which the allowable range is used to protect against unauthorised access to data or instructions. For simplicity of representation, FIG. 2 shows only a single range corresponding to both reading and writing, as opposed to distinct read and write ranges. As shown in the top part of FIG. 2, a particular bounded pointer register PR1 includes a given pointer value 62 and range information 64, which in this example is specified using a lower bound address 68 defining the lower bound of the allowable range and an upper bound address 69 defining the upper bound of the allowable range. For example, the bounds 68, 69 are set to define a range of addresses 80000 to 81000. Errors may be triggered when certain instructions reference the bounded pointer register PR1 and the address determined from the pointer 62 is outside this range.

For example, as shown in part A of FIG. 2, in some systems an error may be triggered if there is an attempt to set the value of the pointer 62 in the pointer register 60 to a value lying outside the range specified by the range information 64 (here it being assumed that the pointer directly specifies an address). This avoids the pointer 62 taking any value outside the specified range so that any accesses using the pointer can be ensured to lie safely within the allowed range. Alternatively, as shown in part B of FIG. 2, an error can be triggered when an instruction attempts to access a location identified by the address of the pointer 62 when that address lies outside the specified range. Hence, it may still be allowable to set the pointer 62 to a value outside the specified range, but once a data access at the pointer address (or an address derived from the pointer) is attempted then an error may be triggered if the address lies outside the allowed range. Other systems may trigger errors in response to both the types of instruction shown in parts A and B of FIG. 2.

The range information 64 could be set in different ways. For example secure code, or an operating system or hypervisor, may specify the range allowed for a given pointer. For example, the instruction set architecture may include a number of instructions for setting or modifying the range information 64 for a given pointer 62, and execution of these instructions could be restricted to certain software or certain modes or exception states of the processor 4. Any known technique for setting or modifying the range information 64 could be used.

In addition to the set of bounded pointer storage elements 60 that may be used at the execute state 12 when executing certain instructions that make reference to a pointer, a program counter capability (PCC) register 80 may also be used to provide similar functionality at the fetch stage 6 when instructions are being fetched from the level one instruction cache 20. In particular, a program counter pointer may be stored in a field 82, with the PCC 80 also providing range information 84 and any appropriate restriction information 86, similar to the range and restriction information provided with each of the pointers in the set of bounded pointer storage elements 60.

Figure 3:
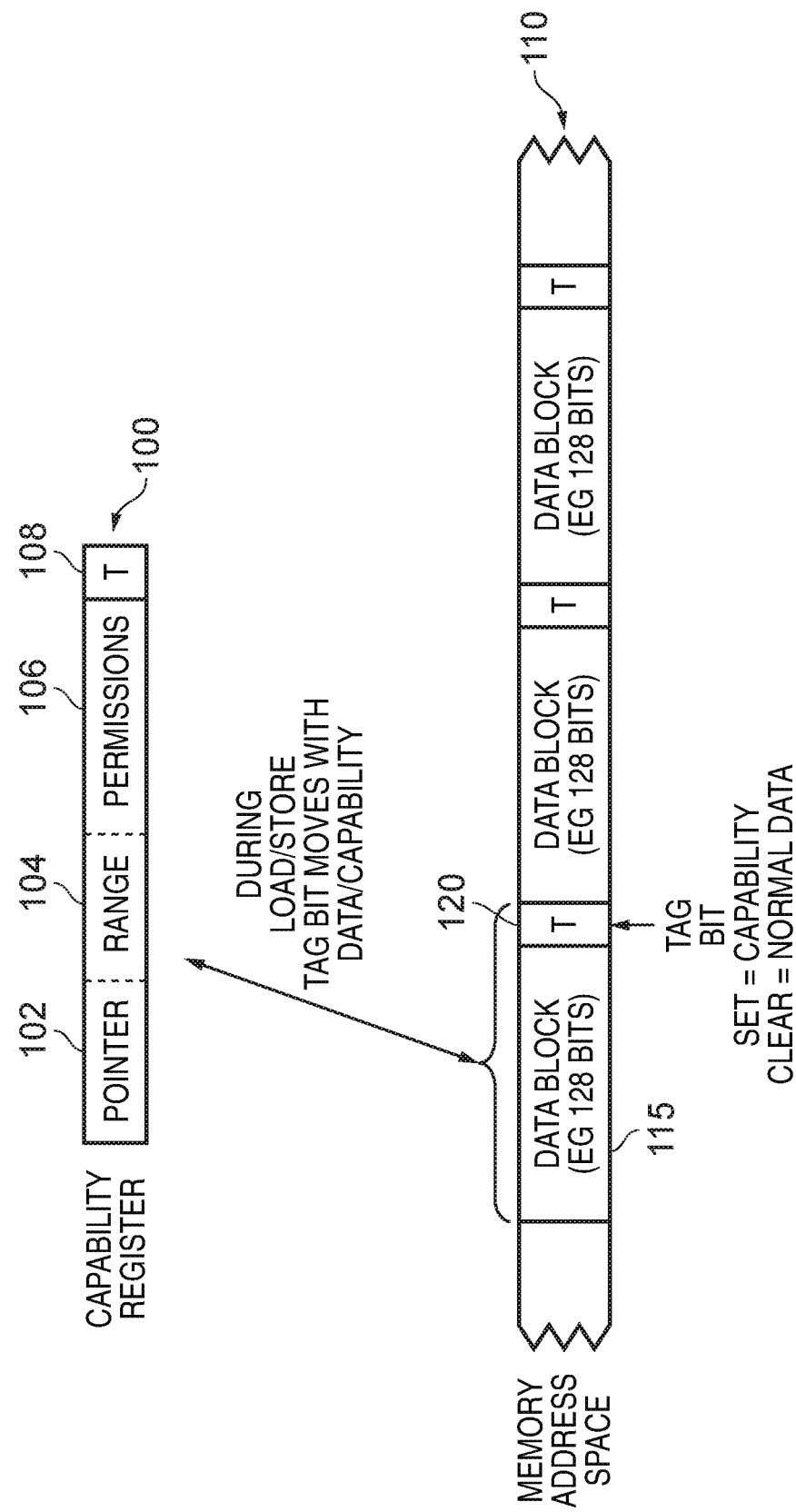
FIG. 3 illustrates the use of a tag bit in association with bounded pointers, in accordance with one example arrangement.

FIG. 3 schematically illustrates how a tag bit is used in association with individual data blocks to identify whether those data blocks represent a capability (i.e. a bounded pointer and associated restrictions information), or represent normal data. In particular, the memory address space 110 will store a series of data blocks 115, which typically will have a specified size. Purely for the sake of illustration, it is assumed in this example that each data block comprises 128 bits. In association with each data block 115, there is provided a tag field 120, which in one example is a single bit field referred to as the tag bit, which is set to identify that the associated data block represents a capability, and is cleared to indicate that the associated data block represents normal data, and hence cannot be treated as a capability. It will be appreciated that the actual value associated with the set or the clear state can vary dependent on implementation, but purely by way of illustration, in one example if the tag bit has a value of 1, it indicates that the associated data block is a capability, and if it has a value of 0 it indicates that the associated data block contains normal data.

When a capability is loaded into one of the bounded pointer registers 60 (also referred to herein as a capability register), such as the capability register 100 shown in FIG. 3, then the tag bit moves with the capability information. Accordingly, when a capability is loaded into the capability register 100, the pointer 102, range information 104 and restrictions information 106 (hereafter referred to as the permissions information) will be loaded into the capability register. In addition, in association with that capability register, or as a specific bit field within it, the tag bit 108 will be set to identify that the contents represent a capability. Similarly, when a capability is stored back out to memory, the relevant tag bit 120 will be set in association with the data block in which the capability is stored. By such an approach, it is possible to distinguish between a capability and normal data, and hence ensure that normal data cannot be used as a capability.

Figure 4:
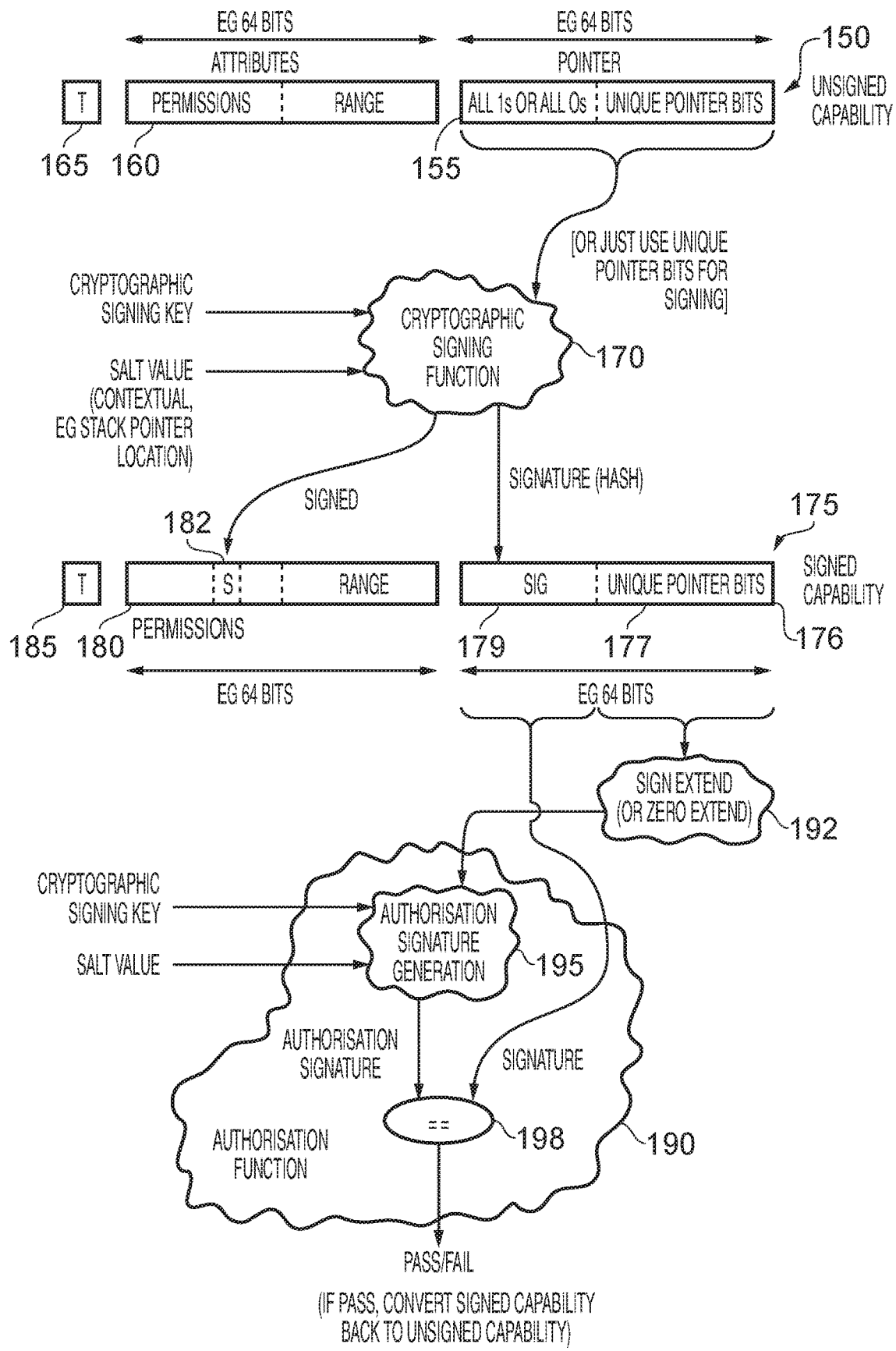
FIG. 4 is a diagram schematically illustrating a signing operation that may be used to add a pointer signature to a bounded pointer or capability, and a corresponding authorisation operation that may subsequently be used to ensure that the pointer field of said bounded pointer or capability with pointer authentication code has not been altered accidentally or maliciously.

FIG. 4 is a diagram schematically illustrating a signing operation that may be used to convert an unsigned capability into a signed capability, and a corresponding authorisation operation that may subsequently be used to convert the signed capability back into an unsigned capability. An unsigned capability 150 (also referred to as an unsigned bounded pointer) is provided as an input operand for the signing operation, the capability 150 comprising a pointer portion 155 and an attributes portion 160. Within the pointer portion 155 a pointer value is specified, and within the attribute portion 160 range information is specified, along with various permissions information indicative of allowed uses of the pointer value provided within the unsigned capability. For example, the permissions information may identify for which type of operations the pointer is allowed to be referenced, and hence for example whether the pointer can be used to identify data to load or store, to identify instructions to be fetched, etc. In addition, as discussed earlier, a tag bit 165 is provided, which is set to identify that the associated block of information represents a capability. The size of the capabilities may be varied dependent on implementation, but consistent with the earlier-described example where a capability comprises 128 bits then in one implementation the pointer portion 155 may comprise 64 bits, and the attributes portion 160 may also comprise 64 bits.

The cryptographic signing function 170 used to convert the unsigned capability into a signed capability receives a number of inputs that are used to derive the signature to be added to form the signed capability. In particular, the function 170 has access to a cryptographic signing key, and in addition has access to a salt value. The salt value can take a variety of forms, but in one example represents contextual information that will only be available to a task or tasks that will legitimately need to unsign the signed capability, and hence which should be able to successfully perform an authorisation operation in respect of the signed capability. The contextual information can take a variety of forms, but in one example may for example be a stack location that will only be known to the task or tasks that will legitimately want to authorise the signed capability.

In addition, the function 170 receives at least a portion of the pointer value stored within the pointer portion 155. In one implementation, it is expected that the pointer value will comprise a certain number of unique pointer bits, with the remaining most significant bits being either a sign-extended version of the unique pointer bits (hence being all ones or all zeros depending on the most significant bit of the unique pointer bits), or a zero-extended version of the unique pointer bits (i.e. all zeros). In one example, this essentially redundant information in a certain number of the most significant bits of the pointer value is used as a location in which to insert the signature once generated, thereby enabling the signature to be incorporated within the signed capability without any loss of information. In an alternative example, the process may be arranged to insert the signature into another part of the capability, for example within a number of the bits of the attribute portion 160. In a yet further example implementation, it may be the case that there are sufficient unused bits within the unsigned capability encoding that those unused bits can be used within the signed capability to hold the signature value.

In the example shown in FIG. 4, it is assumed that the signature is inserted into the upper bits of the pointer portion 155, and in particular in the section that will contain either all ones or all zeros. In the example shown in FIG. 4, it is the case that the entirety of the pointer value is still used as an input to the signing function 170, and a cryptographic signing function is performed using that pointer value, the cryptographic signing key and the salt value, in order to generate a signature, also referred to herein as a hash. Any suitable cryptographic signing function can be used for this purpose.

In an alternative example, the process may be arranged so that only the unique pointer bits are used as an input to the cryptographic signing function 170 rather than the entire pointer value. Irrespective of which approach is taken, if the signature is to be added in the upper portion of the pointer value within the signed capability, the process of the described example will perform a check to ensure that the pointer is "canonical" such that the signing field (i.e. the portion of the pointer value that is to be overwritten with the signature) contains a sign-extended or zero-extended version of the unique pointer bits. This will then ensure that a valid signing process to create a signed capability followed by a valid authorisation process to create an unsigned version of that signed capability will provide a resultant unsigned version that corresponds with the original unsigned capability 150. There are a number of ways in which this check can be performed. For example, in one implementation a check is performed to ensure that this condition is true before signing. Alternatively, a test authentication after signing process could be incorporated within the function 170 in order to compare the original capability against the authorised capability (i.e. the capability created after authenticating the signed capability).

As shown in FIG. 4, once the signature has been created, it is inserted in the section 179 of the portion 176 of the signed capability 175. The unique pointer bits are then retained within the section 177 of the portion 176. Within the permissions portion 180, a signing field 182 is provided, which is set to identify that the capability 175 is a signed capability, and in addition the tag bit 185 is retained in the set state to indicate that the associated 128 bits of data represent a capability. By providing a separate signing field 182, this enables certain requested operations to behave differently dependent on whether the input capability they are provided with is an unsigned capability or a signed capability. This for example enables the apparatus to prevent certain actions being performed in respect of signed capabilities, thereby providing further enhanced security.

As shown in the lower part of FIG. 4, an authorisation function 190 can be invoked in order to seek to unsign the signed capability 175. Firstly, the unique pointer bits 177 are identified, and then subjected to a sign-extending operation 192 in order to generate the original pointer value that was used at the time the signing function 170 was performed. If the original pointer value was expressed in a zero-extended format, then at step 192 a zero-extending operation would instead be performed. Furthermore, if only the unique pointer bits had been used as an input to the signing function 170 then no sign-extension or zero-extension operation is required at step 192, and instead the unique pointer bits can be provided directly to the authorisation signature generation function 195.

As shown in FIG. 4, the authorisation signature generation function 195 also has access to the cryptographic signing key and to a salt value. It will be appreciated that unless the authorisation signature generation function 195 has access to the same salt value (i.e. the same item of contextual information) as was used by the cryptographic signing function 170, then it is highly unlikely that it will generate an authorisation signature that will match the signature inserted in the section 179 of the signed capability.

The authorisation signature generated by the authorisation signature generation function 195 using the relevant pointer bits, the cryptographic signing key and the salt value, is then input to a comparison block 198, where it is compared with the signature held in the section 179 of the signed capability. In the event of a match, then authorisation is said to have been passed, and an unsigned version of the signed capability 175 is generated. Otherwise, a fail condition is identified, causing predetermined actions to be taken.

Assuming the authorisation check is passed, then the unsigned capability is created by removing the signature from the section 179, and replacing it with a sign-extended (or zero-extended depending on implementation) version of the unique pointer bits in the section 177, in order to recreate the initial pointer value. Furthermore, the signing information 182 is cleared to identify that the capability is now unsigned.

The signing field 182 can take a variety of forms. In accordance with one approach, a dedicated single-bit signing field is provided, where a first value indicates that the capability is unsigned and a second value indicates that the capability is signed. In this example, it is assumed that when the value is set to a logic one value, this indicates that the capability is signed, whereas if it is cleared to a logic zero value this indicates that the capability is unsigned. It will be appreciated however that in different implementations the meaning of a logic zero value and a logic one value within the signing field 182 can be reversed.

In accordance with other approaches, a dedicated single-bit signing field is not provided. In some such approaches, as noted below a signature is inserted into the upper bits of a pointer which would ordinarily contain either all ones or all zeroes. Whether or not a pointer is signed can thus be inferred from whether or not all upper bits have the same value.

FIGS. 5A and 5B schematically show bounded pointers 505, 510 according to examples of the present disclosure.

Pointer 505, shown in FIG. 5A, comprises a pointer value 515 for example as described above in relation to FIG. 2.

Pointer 505 further comprises range and permission information 520. The range and permission information 520 encodes the memory addresses to which the pointer 505 may validly point for both reading and writing. The read range can be defined to be different from, or the same as, the write range.

The range and permission information 520 comprises data defining a primary range 525, the primary range being one of the read range and write range. For example, the primary range may be represented as a base address and a limit address, or a base address and a range size. The range and permission information 520 further comprises secondary information 530 from which a secondary range can be determined. The secondary range is the other of the read range and write range. In some examples, the secondary information 530 represents the secondary range in a similar manner to the representation of the primary range, for example as a base address and a limit address. In other examples, the secondary information 530 does not explicitly define the secondary range but instead comprises data based on which the secondary range can be derived from the primary range, for example as described in more detail elsewhere herein.

Pointer 510, shown in FIG. 5B, comprises a pointer value 535 similar to the pointer value 515 of pointer 505. Pointer 510 comprises range information 540 defining read and write ranges, for example in a similar manner to the range and permission information 520 of pointer 505. Pointer 510 comprises a separate permissions field 545. The permissions field 545 defines permissions, or restrictions, applying to the pointer 510 for example as described in more detail with reference to FIG. 1 above.

FIG. 6 is a flow diagram outlining a method 600 according to examples of the present disclosure.

At block 605, an allocator, i.e. a memory allocator, allocates an address space for an object. The address space may for example be a contiguous range of memory addresses.

At block 610, the allocator creates a capability, i.e. a bounded pointer. Creating the capability comprises determining the intended read and write ranges and, based on this, specifying the primary and secondary range information and permissions. The read and write ranges may be determined based on specific characteristics of the object and/or an application associated with the object, particular examples of which are explained in more detail below.

At block 615, the allocator returns a capability to the application that will use the object. In the present example, the capability initially allows both reading and writing across the entire range of memory addresses to which the capability may validly point. For example, in some examples the secondary information is a flag which, when set, indicates that a particular portion of the read range cannot be written to. The capability may thus be created with that flag unset such that the write range is not initially restricted in this manner.

At block 620, the application writes to the aforementioned particular portion of the read range. For example, the application may write data that is intended to be unchanged once written, such as a cryptographic salt. Following this write, the application diminishes the capability to restrict the particular portion of the read range to be read-only. For example, where the secondary information is an initially unset flag as described above, the diminishing may comprise setting the flag. In one such example, the flag has a binary value of 0 when unset and 1 when set, such that setting the flag comprises writing a 1 to overwrite the 0. In one example, the hardware (for example the architecture of a processor performing the method 600) ensures that a capability can be diminished as and when desired but never augmented. In other words, the hardware permits the primary and/or secondary ranges to be reduced, but never expanded.

At block 625, subsequent read and write operations are conducted. These operations are controlled based on the read and write ranges encoded in the primary and secondary range information such that, for example, reading is permitted across the entire range of memory addresses to which the capability may validly point, but writing is not permitted within a read-only range.

An example of one particular application of the technique 600 will now be described with reference to FIG. 7.

In this example, a bounded pointer 705 comprises a pointer value 710 and range and permission information 715 as described above in relation to FIG. 5A. The range information 715 permits the pointer 705 to be used to create an address within the memory addresses corresponding to an object 720. In other words, the pointer can be used to validly create an address identifier 710 for a memory address within the range of memory addresses corresponding to the object 720.

The range of memory addresses corresponding to the object 720 can be defined in terms of a base address C.BASE 725 and a limit address C.LIMIT 730. The base address 725 is the first address corresponding to the object 720 and the limit address 730 is the address of the byte beyond the end of the object 720.

A cryptographic salt 735 is stored in a range of memory addresses at the beginning of the memory space corresponding to the object 720, based on which the pointer 705 is signed with a signature 740. An example of such pointer signing is described above with reference to FIG. 4. Following signing of the pointer 705, the pointer 705 can be authorised using the salt 735.

The range and permission information 715 is set to define read and write ranges 745, 750 such that the pointer 705 can, for both read and write operations, be used to create memory addresses within the memory space of the object 720 and external to the salt 735 (indicated by a solid line in FIG. 7). The range and permission information 715 is further set such that the pointer 705 can be used, for read operations, but not write operations, to create memory addresses within the address range containing the salt 735 (indicated by a dashed line in FIG. 7). In other words, the salt 735 is read-only. This improves reliability by providing resistance against modification of the salt, either accidentally or maliciously, which would cause failure of attempts to use the salt 735 to authorise the signed bounded pointer 705.

As an example, the salt may have a predefined size. For example, where the pointer 705 is implemented within an ARMv8.3 architecture, the salt may have a predefined size of 8 bytes. The range and permission information 715 can then represent the read and write ranges by way of an explicit definition of the base address 725 and limit address 730, and a flag indicating whether the first 8 bytes should be excluded from the write region.

In some examples, the pointer 705 is initially created with range and permission information 715 such that the pointer can write to the entire memory range corresponding to the object 720. In other words, no part of the range is initially read-only. The pointer 705 is used to write the salt 735, following which the range and permission information 715 is set to diminish the write range such that the salt 735 becomes read-only. For example, where the salt has a predefined size and the range and permission information 715 comprises a flag indicating whether the salt should be excluded from the write region, the flag may be initially unset and then set following the initial writing of the salt.

Alternatively or additionally, when the memory space corresponding to the object 720 is freed, the allocator (which is not constrained by the range and permission information 715 of the pointer 705) overwrites the memory addresses corresponding to the salt 735. For example, the addresses could be overwritten with zeroes. Subsequent attempts to authorise the pointer 705 would then fail because the salt would no longer have the value used when signing the bounded pointer. This provides resistance against use-after-free attacks in which, after freeing the memory space corresponding to the object 720, a malicious entity attempts to access the memory space that previously corresponded to the salt 735.

An example of a further particular application of the technique 600 will now be described with reference to FIG. 8.

In this example, a bounded pointer 805 comprises a pointer value 810 and range and permission information 815 as described above in relation to FIG. 5A. The pointer is associated with an application and points to memory addresses within a stack 820 comprising a stack frame 825.

The range information 815 encodes a write range base equal to a stack frame base 830 and a write range limit equal to a stack frame limit 835, thereby defining the write range as covering the extent of the stack frame 825. The range information 815 further comprises an indication, such as a flag, of whether the read range is limited by the write range limit. Thus, when the flag is unset, reading and writing is permitted for memory addresses within the stack frame 825, but forbidden for memory addresses outside the stack frame. Conversely, when the flag is set, the read range has a base equal to that of the write range (i.e. the stack frame base 830) but no specific read limit. Reading is thus permitted for memory addresses of the stack 820 that are above the stack frame 825.

In some examples, while the range and permission information 815 does not specifically define a read range limit, other system mechanisms (for example defined in processor or system architecture) prevent the pointer 805 from being used to access memory locations outside the stack 820. The pointer 805 thus has an effective read range equal to the extent of the stack 820.

It will be appreciated that the present example can therefore be used to permit an application to read the entirety of its stack (indicated by a dotted arrow), but only write to its stack frame (indicated by a solid arrow). This is achieved by way of a single bounded pointer 805 with differing read and write ranges. This is significantly more efficient in terms of storage and processing power than an approach in which separate bounded pointers are defined for reading and writing.

An example of a further particular application of the technique 600 will now be described with reference to FIG. 9.

In this example, a bounded pointer 905 comprises a pointer value 910 and range and permission information 915 as described above in relation to FIG. 5A. The range information 915 permits the pointer 905 to point to memory addresses corresponding to an object 920. In other words, the pointer value 910 can validly be used to create a memory address within the range of memory addresses corresponding to the object 920.

The range of memory addresses corresponding to the object 920 can be defined in terms of a base address C.BASE 925 and a limit address C.LIMIT 930. The base address 925 is the first address corresponding to the object 920 and the limit address 930 is the address of the byte beyond the end of the object 920.

A pointer 935 to a virtual method table, or v-table, 940 is stored at the beginning of the memory space corresponding to the object 920. As will be appreciated by those skilled in the art, the v-table 940 is a table of methods available to the object 920. For example, the v-table 940 may be a table of pointers to each method that can operate on objects of a class of which the object 920 is an instance.

The range and permission information 915 is set to define read and write ranges 945, 950 such that the pointer 905 can be used, for both read and write operations, to create memory addresses within the memory space of the object 920 and external to the v-table pointer 935 (indicated by a solid line in FIG. 9). The range and permission information 915 is further set such that the pointer 905 can be used for read operations, but not write operations, to create memory addresses within the range associated with the v-pointer 935 (indicated by a dashed line in FIG. 9). In other words, the v-table pointer 935 is read-only. This improves reliability by providing resistance against modification of the v-table pointer. This improves resilience against malicious attacks in which the v-table pointer is modified to point to memory addresses other than the v-table 940, for example to cause execution of methods other than those in the v-table 940.

The v-table pointer 935 may have a predefined size. In such examples, the range and permission information may comprise an explicit definition of the extent of the read range and a flag indicating whether a region of the predefined size should be excluded from the write range, in a similar manner to that described above in relation to FIG. 7. In some examples utilising such a flag, the flag is initially unset such that the pointer 905 can be used to perform an initial write of the v-table pointer 935. Following the initial write, the flag can be set in a similar manner to that described above in relation to FIG. 7.

Through use of the above described techniques, it will be appreciated that a single bounded pointer can express differing read and write ranges. This can improve reliability and security in a wide range of applications, for example where at least some data which can be accessed via a pointer is desired to be written once in an initial write, and then not subsequently modified. Methods described herein allow such data to be rendered read-only following the initial write.

Methods described herein may be performed in hardware and/or software. Such hardware may be a general-purpose processor, or a more specific unit such as an application-specific integrated circuit or a field-programmable gate array.

Although illustrative examples of the invention have been described in detail herein with reference to the accompanying drawings, it is to be understood that the invention is not limited to those precise examples, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
a storage comprising storage elements to store bounded pointers, each bounded pointer comprising a pointer value and associated attributes including at least range information; and
processing circuitry to store a bounded pointer in a chosen storage element, said storing comprising:
storing in the chosen storage element a pointer value of the bounded pointer;
storing in the chosen storage element the range information of the bounded pointer, such that the range information indicates both a read range of the bounded pointer and a write range of the bounded pointer that differs to the read range, wherein:
the read range comprises at least one memory address for which reading is allowed when using the bounded pointer; and
the write range comprises at least one memory address to which writing is allowed when using the bounded pointer.

2. An apparatus according to claim 1, wherein either:
the write range is a proper subset of the read range; or
the read range is a proper subset of the write range.

3. An apparatus according to claim 1, wherein the range information comprises:
primary information defining a primary range, the primary range being one of the read range and the write range and extending from a base address to a limit address; and
secondary information such that a secondary range can be determined based on the primary range and the secondary information, the secondary range being the other of the read range and the write range.

4. An apparatus according to claim 3, wherein the primary information comprises the base address of the primary range and one of:
the limit address of the primary range; and
a size of the primary range.

5. An apparatus according to claim 3, wherein either:
the limit address of the primary range is a secondary range limit address of the secondary range; or
the base address of the primary range is a secondary range base address of the secondary range.

6. An apparatus according to claim 3, wherein:
the secondary information identifies how at least one of a secondary range base address and a secondary range limit address are determined from the base address and limit address of the primary range.

7. An apparatus according to claim 6, wherein the secondary information is a flag that, when set, indicates that the secondary range excludes a predefined portion of the primary range.

8. An apparatus according to claim 7, wherein:
prior to an initial write to an address derived from the bounded pointer, the flag is not set; and
the processing circuitry is arranged to set the flag following the initial write.

9. An apparatus according to claim 6, wherein the secondary information comprises a flag indicating that the limit address of the secondary range is unconstrained by the limit address of the primary range.

10. An apparatus according to claim 1, wherein:
the pointer value of the bounded pointer identifies a memory address within an address space for an object, a location within said address space storing a pointer identifying a data structure identifying methods available to said object;
the read range includes said pointer to the data structure; and
the write range excludes said pointer to the data structure.

11. An apparatus according to claim 10, wherein the data structure is a virtual method table of an object class to which said object belongs.

12. An apparatus according to claim 1, wherein:
the pointer value of the bounded pointer identifies a memory address within an address space for an object;
part of said address space comprises metadata for the object;
the read range includes said part comprising the metadata; and
the write range excludes said part comprising the metadata.

13. An apparatus as claimed in claim 12, wherein:
the attributes of the bounded pointer comprise a signature for authenticating the bounded pointer; and
the metadata comprises a salt value used when generating said signature.

14. An apparatus according to claim 13, further comprising:
an allocator to allocate the address space to the object, the allocator retaining write access to the address space; and
when the allocator determines to free the address space allocated to the object, the allocator is arranged to overwrite the salt value.

15. An apparatus according to claim 12, wherein the range information of the bounded pointer comprises:
read range data defining the read range; and
exclusion data indicating that the write range excludes said part of the address space containing the metadata.

16. An apparatus according to claim 12, wherein said part of the address space containing the metadata has a predefined size.

17. An apparatus according to claim 1, wherein:
the pointer value of the bounded pointer identifies a memory address within a stack frame of an application, the stack frame residing within a stack;
the read range includes the stack frame, and a further portion of the stack,
the write range is constrained to the stack frame of the stack, and excludes the further portion of the stack.

18. An apparatus according to claim 17, wherein:
the range information indicates a base address of the stack frame and a limit address of the stack frame; and
the range information comprises a flag indicating that the limit address of the stack frame is not a limit address of the read range.

19. A method of storing a bounded pointer in a storage element of a storage, comprising:
storing a pointer value of the bounded pointer; and
storing range information of the bounded pointer, such that the range information indicates both a read range of the bounded pointer and a write range of the bounded pointer that differs to the read range, wherein:
the read range comprises at least one memory address for which reading is allowed when using the bounded pointer; and
the write range comprises at least one memory address to which writing is allowed when using the bounded pointer.

20. An apparatus comprising:
   storage means comprising storage element means for storing bounded pointers, each bounded pointer comprising a pointer value and associated attributes including at least range information; and
   processing means for storing a bounded pointer in a chosen storage element means, said storing comprising:
      storing in the chosen storage element means a pointer value of the bounded pointer;
      storing in the chosen storage element means the range information of the bounded pointer, such that the range information indicates both a read range of the bounded pointer and a write range of the bounded pointer that differs to the read range, wherein:
         the read range comprises at least one memory address for which reading is allowed when using the bounded pointer; and
the write range comprises at least one memory address to which writing is allowed when using the bounded pointer.

\* \* \* \* \*